United States Patent Office 3,208,224
Patented Sept. 28, 1965

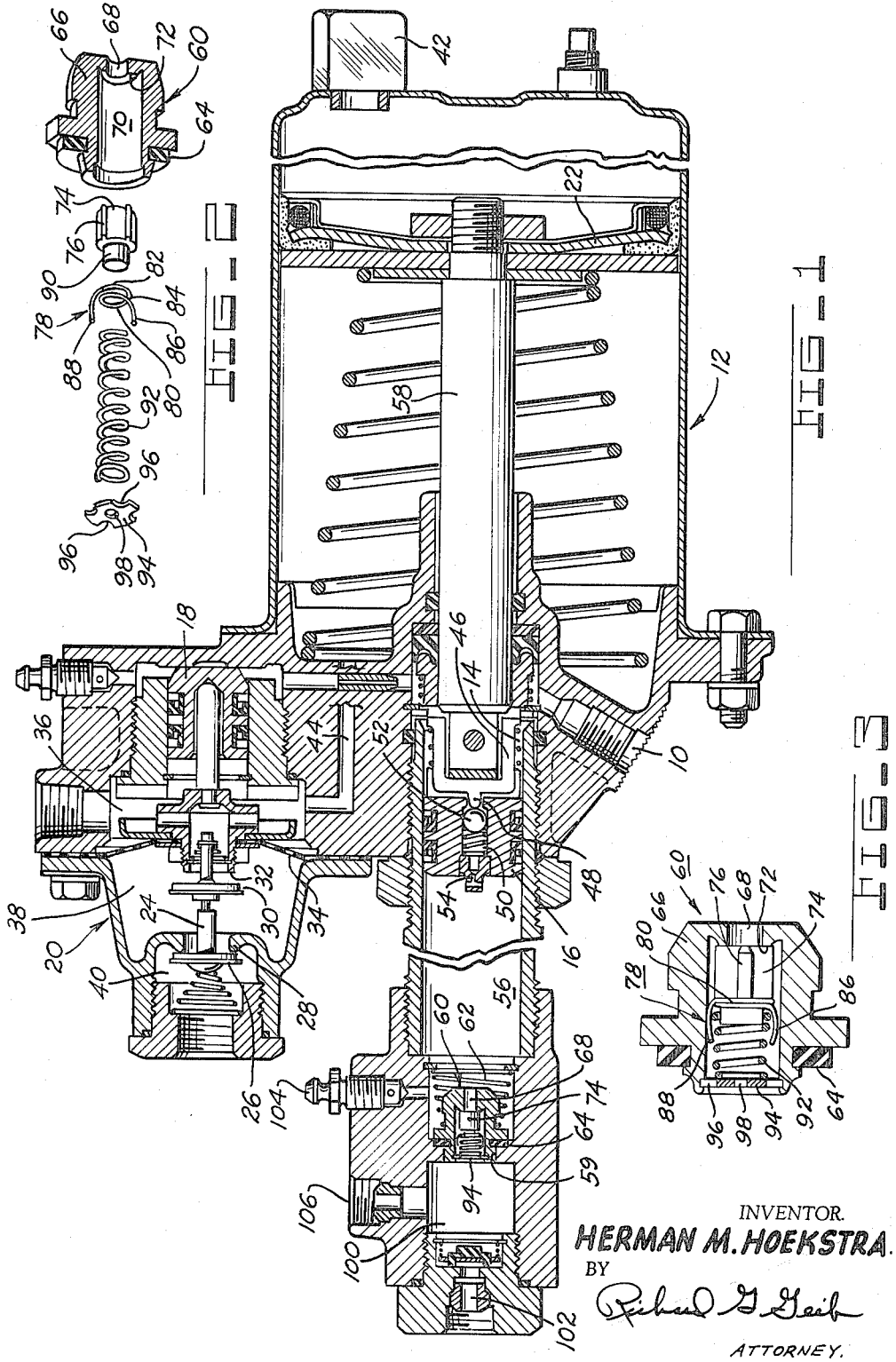

3,208,224
POWER BRAKE APPARATUS
Herman M. Hoekstra, South Bend, Ind., assignor to The Bendix Corporation, South Bend, Ind., a corporation of Delaware
Filed Mar. 11, 1963, Ser. No. 264,316
3 Claims. (Cl. 60—54.6)

This invention relates to a power brake unit having both a power cylinder and hydraulic cylinder with the latter operatively connected to the former such that power and/or manual operation of the brake unit may be readily available.

In almost all power units for braking systems some arrangements have been made to allow manual as well as power brake operation. In some of those systems, such as are concerned with my invention, a brake master cylinder is utilized to provide a control pressure for a power brake valve or a braking pressure in the event of power failure. Frequently manual operation takes place in emergency conditions where an operator jams his foot on the brake pedal. In fact during panic operation of the power brake units of the type concerned with my invention, there is a tendency to at first supply high pressure fluid directly from a master cylinder through a pressure intensifying unit before the power unit can catch-up.

However, in order to stabilize pressures in a vehicle's brake system it has become necessary to place high pressure check valves in the pressure intensifying unit to prevent loss of input displacement before valve crack. This can happen on a very slow or slam application. The high pressure check valve is designed to open at a pressure greater than needed to operate the control valve. This valve is a high pressure valve when fluid is moving out and a residual pressure valve when the fluid is returning. Such check valves have shown a tendency to chatter in brake operation and to be noisy at the same time. Therefore, it is a principal object of this invention to provide a chatter and noise free high pressure check valve. High pressure check valve noise or chatter is the greatest during a moderate brake application and is caused by the fast change in differential pressure across the poppet. Each time the poppet unseats, the input pressure drops and the poppet seats until enough pressure to unseat it is again built up. This action is very fast. The friction device slows or stops this action.

It is a further object to provide a check valve for a hydraulic unit of a power brake system which is frictionally damped such that its operation is distinct as compared with fluctuation of the prior art valves; i.e., the valve will open and close without oscillating.

A still further object of my invention is to provide a check valve with means to divide a flow into parallel streams to reduce the noise of such a flow through an opening.

As will be readily realized by those skilled in the art to which my invention relates, other objects and advantages of the present invention will become apparent by reading the following description of the accompanying drawings in which:

FIGURE 1 is a vertical sectional view of a vehicle braking system power unit embodying my invention;

FIGURE 2 is a partially sectioned perspective explosion of a check valve for the power unit of FIGURE 1 in accordance with by invention; and FIGURE 3 is a cross sectional enlarged view of the parts of the exploded FIGURE 2 assembled in their proper position.

In more detail, a conventional master cylinder (not shown) which is operated by a brake pedal (not shown) is hydraulically connected by means of a conduit to a fluid inlet 10 of the power unit 12. The power or fluid pressure intensifying unit 12 may be of any suitable type, and, as shown in the drawing, are designated to use an air pressure to provide a motor force for increasing the intensity of the pressure signal which is received from the master cylinder. These fluid pressure units correspond generally to the type shown and described in the T. H. Thomas Patent No. 2,661,598; and for a complete understanding of their construction and operation, reference may be had to that patent.

In order, however, that a description of the operation can be had without referring to that patent, a short description of the unit will now be given.

The inlet pressure received from the master cylinder flows to a follow-up chamber 14 that is positioned on the inner side of a piston 16 for the power unit 12. At the same time inlet fluid pressure is communicated to the inner end of a valve actuating piston 18 to operate a control valve 20 and thereby control a piston 22 of the power unit 12.

The control valve 20 generally comprises a spool shaped poppet member 24 having an outer flange 26 adapted to abut a high pressure valve seat 28, and an inner flange 30 adapted to abut a movable tubular valve seat 32. The tubular valve seat is affixed to a diaphragm 34 which separates an atmospheric valve chamber 36 from a control chamber 38; whereas the region 40 outwardly of the valve seat 28 is continually communicated with a supply of high pressure air. The control chamber 38 is communicated by a conduit (not shown) to an inlet port 42 leading to a chamber behind piston 22, and the atmospheric chamber is communicated by a passageway 44 to a chamber ahead of piston 22 in the power unit.

In the deenergized condition of the braking system, the fluid pressure intensifying unit 12 will be in a state of rest as shown by FIGURE 1. Pressure from the master cylinder, however, forces the valve actuating piston 18 inwardly to cause the tubular valve seat 32 to abut flange 30, and thereafter prevent further atmospheric connection between chambers 36 and 38 which then shuts off atmosphere communication to the chamber behind piston 22.

At the same time fluid from the master cylinder enters the follow-up chamber 14 and flows about a wishbone structure 46 having a projection 48 to the compensating passageway 50 provided through piston 16. The passageway is normally controlled by a ball check valve 52 and a flow restrictor 54. Thus the pressure in chamber 56 ahead of piston 16 is increased.

As a further braking force is applied, the inlet fluid pressure from the master cylinder causes continued forward movement of piston 18 to lift the poppet flange 26 from seat 28 and allow a high pressure fluid to flow into control chamber 38 and to the back side of piston 22 to force a piston rod 58 connected to piston 22 to drive the piston 16 into chamber 56. This will reduce pressure in chamber 14 and allow air pressure acting on diaphragm 34 and on flange 26 plus the spring pressure on flange 26 to close seat 28 in accordance with the opposing pressure on piston 18.

The chamber 56 will usually be designed to have a displacement which equals the sum of the maximum displacements of a vehicle braking system's wheel cylinders (not shown) to which it is connected. It has also been found that a good design is presented by supplying a master cylinder whose delivery chamber provides a total displacement equal to or slightly in excess of that attributable to follow-up chamber 14; so that the foot pedal operatively connected to the master cylinder will approach the floorboard of the vehicle when the braking system is operating normally, and the lining material of the vehicle's braking means has worn to its limits. This provides an indication to a vehicle operator of the need for brake servicing. This also requires that master cylinder design take into account the need for pumping. Such features are normally provided by spring returned master cylinder pistons in combination with residual pressure check valves in the master cylinder delivery port to retard return flow while the pistons are being returned for drawing in additional fluid and stroking. If desired, the follow-up can be approximately one half the capacity of chamber 56, the outlet chamber, so that the operator need only stroke or pump his brake pedal once in order that the brakes be applied in a no power condition.

As with the delivery port of the master cylinder, the outlet port 59 is provided with a residual pressure check valve 60 held by a spring 62 to seat a rubber or similar yieldable composition ring 64 to the inward face of the outlet port. The residual pressure check valve 60 is formed with a housing 66 having an axial opening 68 leading to a chamber 70 therein (see FIGURE 2). Adjacent the entrance to chamber 70 about opening 68, a high pressure valve seat 72 is formed, and a high pressure valve poppet 74 is radially positioned by axial surfaces 76 within chamber 70 to cooperate with seat 72 and control communication between the opening and the chamber 70.

A friction means 78 adapted to engage the sidewalls of chamber 70 is mounted to poppet 74 to dampen poppet motion in the chamber. As seen in FIGURE 2, a preferred form of this friction member is economically provided by a coiled spring 80 having at least two radiating portions 82 with rearwardly extending ends 84. The cross-sectional diameter of the ends 84 is greater than that of chamber 70 so that the sidewalls of the chamber exert a compressive force on the ends 84 to create friction between the ends and the sidewalls.

The friction means is held on a shank 90 of the poppet 74 by a spring 92 which is compressed in chamber 70 between the poppet and an end plate 94. The spring 92 further increases the resistance on poppet 74 and is the principal force causing the poppet to abut seat 72. As seen, the plate 94 substantially closes the chamber 70 opposite the entrance of opening 68. However, I have provided a plurality of cut-outs 96 in the plate at the periphery thereof and a central passage 98. These cut-outs and central passage divide the flow from chamber 70 into several parallel streams. This reduces the noise of high pressure flow exhausting into a delivery chamber 100.

By way of completing the description of the construction shown by FIGURE 1, I provide a replenishing port 102 having a compensating valve with means to connect a line to a master cylinder reservoir, a means to bleed air in the form of a bleed screw connection 104 and a fluid pressure connection 106 to receive the necessary conduit communicating the power unit 12 with the vehicle's wheel brake application means.

By way of description of an emergency or panic manual operation of the unit 12, the fluid entering at port 10 is at an extremely high pressure which passes through chamber 14 and about the ball valve 52 to build up pressure in chamber 56 until sufficient pressure is built up to operate the control valve through piston 18 whereupon poppet 74 is unseated. The net result is a high pressure fluid acting against valve 60 and poppet 74. As the poppet 74 moves off seat 72, I have found that there tend to be minor variations in the pressure so built up in chamber 56 and that these variations tend to cause valve chatter of prior art mechanisms. However, the friction means 78 will hold the valve poppet 74 off the seat 72 until the pressure in chamber 56 drops to a distinct level to allow the spring 92 to snap the poppet against the seat. Thus, valve oscillation is prevented. In addition, as the pressure in chamber 56 under such applications is of a high magnitude the noise of expansion from chamber 70 to chamber 100 is reduced by dividing the flow into several small diameter streams.

While the invention has been described in considerable detail, I do not wish to be limited to the particular constructions shown and described. Rather, it is my intention to cover hereby all novel adaptations, modifications and arrangements thereof which come within the practice of those skilled in the art to which the invention relates.

I claim:
1. A means to control fluid delivery from a pressure intensifying device, which means comprises:
   a valve body resiliently mounted in said pressure intensifying device ahead of a fluid outlet from said device, said valve body having an axial opening communicating with said device and leading to a chamber within said valve body, which chamber is communicated with the fluid outlet;
   a poppet member slidably mounted in said chamber between the opening in the valve body and the communication between said chamber and said outlet, said poppet member having a shank projecting therefrom;
   a first spring means coiled about said shank portion of said poppet such that it has radially and axially extending ends that in their free state are of greater diameter than the sidewalls of said chamber so as to frictionally engage the sidewalls of said chamber to radially position said poppet within said chamber; and
   a second spring means operatively connected to an end wall of said chamber adjacent the communication of said chamber to said outlet and bearing, opposite the end wall of said chamber, over said first spring means about the shank of said poppet upon the radiating ends of said first spring means to hold said first spring means on said poppet and axially position said poppet to abut said valve body to close said opening into said chamber.

2. In a vehicle braking system according to claim 1 a means to divide flow communicated from said chamber to said fluid outlet into a plurality of parallel streams, which means provides the end wall for said chamber adjacent said outlet and forms a bearing plate for said second spring means.

3. In a vehicle braking system according to claim 2 an annular resilient member encircling said valve body and arranged to seat against said fluid outlet.

References Cited by the Examiner

UNITED STATES PATENTS

| | | | |
|---|---|---|---|
| 2,509,958 | 5/50 | Burn | 137—493.6 |
| 2,730,124 | 1/56 | Buchanan | 137—493.6 |
| 2,787,122 | 4/57 | Price et al. | 60—54.5 |
| 2,858,911 | 11/58 | Price | 60—54.5 X |
| 3,072,143 | 1/63 | Fleischhacker | 137—514 |

JULIUS E. WEST, *Primary Examiner.*

ROBERT R. BUNEVICH, *Examiner.*